(12) United States Patent
Ophey

(10) Patent No.: US 7,170,690 B2
(45) Date of Patent: Jan. 30, 2007

(54) ZOOM LENS

(75) Inventor: Willem Gerard Ophey, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/534,077

(22) PCT Filed: Oct. 31, 2003

(86) PCT No.: PCT/IB03/04879

§ 371 (c)(1),
(2), (4) Date: May 6, 2005

(87) PCT Pub. No.: WO2004/044638

PCT Pub. Date: May 27, 2004

(65) Prior Publication Data

US 2006/0061871 A1    Mar. 23, 2006

(30) Foreign Application Priority Data

Nov. 11, 2002    (EP) ................................. 02079685

(51) Int. Cl.
*G02B 15/14*    (2006.01)

(52) U.S. Cl. ...................................... 359/676; 359/678
(58) Field of Classification Search ......... 359/676–692
See application file for complete search history.

(56) References Cited

U.S. PATENT DOCUMENTS

| | | | | |
|---|---|---|---|---|
| 4,249,798 A | | 2/1981 | Moskovich | 359/683 |
| 4,278,330 A | * | 7/1981 | Buchroeder | 359/676 |
| 4,702,567 A | * | 10/1987 | Kato et al. | 359/683 |
| 4,840,468 A | * | 6/1989 | Tanaka | 359/684 |
| 5,136,431 A | * | 8/1992 | Terasawa et al. | 359/684 |
| 5,745,301 A | | 4/1998 | Betensky et al. | 359/689 |
| 6,339,508 B1 | | 1/2002 | Nozawa et al. | 359/686 |
| 6,373,640 B1 | * | 4/2002 | Betensky et al. | 359/689 |
| 6,844,989 B1 | * | 1/2005 | Jo et al. | 359/716 |

* cited by examiner

*Primary Examiner*—Scott J. Sugarman
*Assistant Examiner*—M. Hasan
(74) *Attorney, Agent, or Firm*—Michael E. Belk

(57) ABSTRACT

In a zoom lens (30) comprising, from the object side to the image side, a front lens group (12) and a controllable lens group (24), the controllable lens group comprises two lens elements (25, 26) having different dispersions and being movable with respect to each other so as to perform a focusing action. One of the lens elements corrects for the dispersion of the zoom lens. Preferably, the zoom lens comprises at least one folding mirror.

5 Claims, 4 Drawing Sheets

ZOOM LENS

The invention relates to a zoom lens having at least a front lens group and a controllable lens group.

The invention also relates to a camera comprising such a zoom lens and to a handheld device comprising such a camera.

A conventional zoom lens comprises a number of solid lens elements made of a transparent material like glass or a transparent plastic. These lens elements are grouped in a front lens group at the object side, a rear lens group at the image side, and a controllable lens group between the front group and the rear group. Each of these groups may consist of one or more lens elements. Lens elements of the controllable lens are movable for performing zooming. Zooming is understood to mean changing the image scale, i.e. selecting the size of the object scene that is imaged, by changing the focal distance of the zoom lens. The maximum settings of the zoom lens are Tele configuration, wherein a small portion of an object scene is imaged, and wide configuration, wherein a larger portion of an object scene is imaged. By moving lens elements of the controllable lens group the zoom lens can be set between these two extreme configurations and configurations therebetween.

Currently miniature cameras are incorporated into handheld apparatuses, like mobile phones and thus the need arises for a zoom lens for such a camera. The built-in height of a zoom lens for a miniature camera should be adapted to the space available in a handheld apparatus. The built-in height of a camera to incorporated into a mobile phone is the distance between the front lens element and the rear of the image sensor of the camera, which sensor converts the received image into electrical signals. This is because, the front lens element should be accommodated in the front surface of the apparatus. The optical axis of the zoom lens thus extends in the depth direction of the apparatus. A practical requirement for a mobile phone or other handheld apparatus is that its depth, or thickness, is small. The built-in height of a camera with a zoom lens is mainly determined by the space that is needed to displace the controllable lens group.

In addition to a zooming action, a focusing action should be carried out in a zoom lens. Focusing is understood to mean keeping the selected object scene in focus for every configuration of the zoom lens system. Conventionally the focusing action can be performed by moving either the front lens group or the image sensor up and down along the axis of the zoom lens. This requires additional space and increases the length of the zoom lens and thus the built-in height of the camera.

If in a lens system, such as a miniature zoom lens, the number of lens elements should be as small as possible, a holographic grating may be included, for example in the controllable lens group in the case of a zoom lens, to correct for the dispersion of the lens elements. The diffraction angle of such a grating is different for the different wavelengths of the natural light incident on it. This wavelength dependency can be used to substantially correct for the wavelength-dependent behavior of the lens elements of the zoom lens. If no diffraction grating is used, additional elements will have to be used for correction of the dispersion of the lens elements. However, the diffraction efficiency of the grating is optimum for one wavelength only and lesser for other wavelengths. This means that not all of the light of said other wavelengths is deflected in the required direction, which results in additional, ghost, blurred images being formed on the image sensor by said other wavelengths. The contrast of the image on the image sensor will thus be impaired.

It is an object of the invention to provide a zoom lens which has a small built-in height, thus is suitable for a miniature camera, and is well corrected for dispersion. This zoom lens is characterized in that the controllable lens group comprises two lens elements which are made of different lens materials and are movable with respect to each other.

Distributing the lens function of the controllable lens over two lens elements allows this lens to perform two additional functions. The dispersion can be corrected by the use of lens materials with different refractive indices. Moving the lens elements with respect to each other makes focusing possible, so that no extra space is required for moving either the front lens group or the image sensor. Zooming is performed by moving the entire controllable lens group.

A preferred embodiment of the zoom lens having a lens stop is characterized in that the lens stop is arranged near the first lens element of the controllable lens group and is movable together with this lens group.

The stop in a lens system is the smallest opening, formed by a diaphragm, in the system. This stop restricts the diameter of the imaging beam and prevents stray radiation or radiation from unwanted reflections from being introduced intro the imaging beam and causing a reduction of the contrast in the image. Arranging the stop near the controllable, i.e. movable, lens group, and moving the stop simultaneously with this lens group allows a restriction of the diameter of the lens elements of this group to approximately that of the stop opening. The use of such small lens elements reduces the chance of false light being coupled into the lens system.

The position of the stop in the zoom lens system is also of great importance for an essential feature that allows a substantial reduction of the built-in height of the zoom lens. An embodiment of the zoom lens which includes this feature is characterized in that it comprises at least a folding mirror arranged between the front lens group and the controllable lens group.

The special design of the zoom lens having only a front lens group comprising a single lens element and the controllable lens allows the creation of sufficient space between the front group and the controllable group. The embodiment with the folding mirror renders it possible to arrange the main portion of a camera with the zoom lens parallel to the main surface of a device in which the camera is to be incorporated.

The design of conventional zoom lenses does not allow introduction of a folding mirror; there is not enough space between the lens elements to arrange a folding mirror.

It is noted that U.S. Pat. No. 6,339,508 discloses a zoom lens for a miniature camera to be incorporated into a mobile phone, which zoom lens includes a folding mirror between a front lens element and a movable lens group. The group comprises a relatively large number of lens elements. In this zoom lens, focusing is performed by moving the front lens element or the rear lens element, for which movement space has to be reserved.

A further reduction in size is obtained in an embodiment which is characterized in that it comprises a second folding mirror arranged behind the controllable lens group.

In this way the track length of the zoom lens can be reduced without substantially increasing its dimension in the direction perpendicular to the length direction.

U.S. Pat. No. 4,249,798 discloses a zoom lens for a pocket camera, which zoom lens comprises a first folding mirror between a front lens group and a movable lens group and a second folding mirror between the movable lens group and the rear lens group. The front lens group and the rear lens group each comprise two lens elements, and the movable lens group comprises four lens elements. The lens stop is arranged between the third and the fourth lens element of the movable lens group. In this zoom lens again focusing is not performed in that moving elements of the movable lens group are moved with respect to each other.

An embodiment of the zoom lens having a folding mirror at the object side portion may be further characterized in that this folding mirror is integrated with the front lens group.

In this way the number of elements of the zoom lens is reduced by one, which reduces the manufacturing cost.

Another embodiment of the zoom lens having two folding mirrors is characterized in that the first folding mirror is arranged such that the angle between the normal to its reflective surface and the optical axis is greater than 45°.

The image sensor may then be arranged closer to the optical axis of the zoom lens so that the total size of the camera can be further reduced.

As a camera wherein the zoom lens is incorporated is distinguished from conventional cameras by features provided by the invention, such a camera forms part of the invention.

As the incorporation of such a camera into a handheld apparatus provides such an apparatus with a zooming function, such an apparatus also forms part of the invention.

These and other aspects of the invention are apparent from and will be elucidated, by way of non-limitative example, with reference to the embodiments described hereinafter. In the drawings.

In these Figs, the same reference numbers denote the same elements.

Figure 1A:
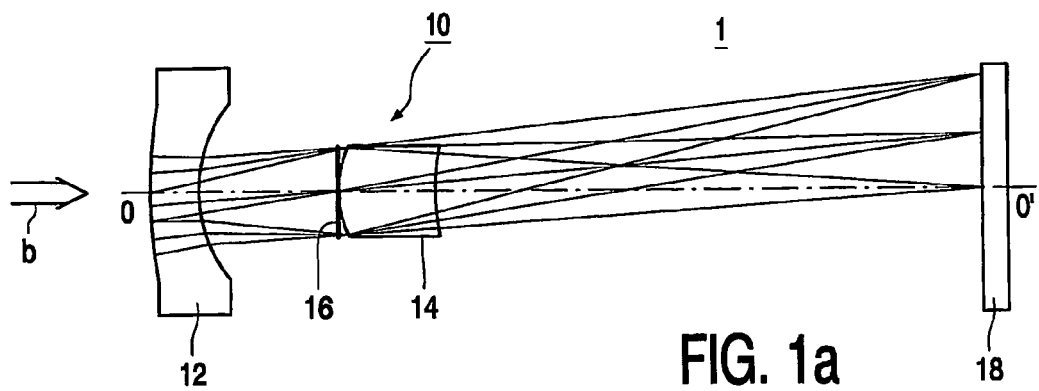
FIGS. 1a and 1b show a design principle of a zoom lens for a miniature camera, with ray trace plots for the Tele configuration and the wide configuration, respectively, of this zoom lens.
Figure 1B:
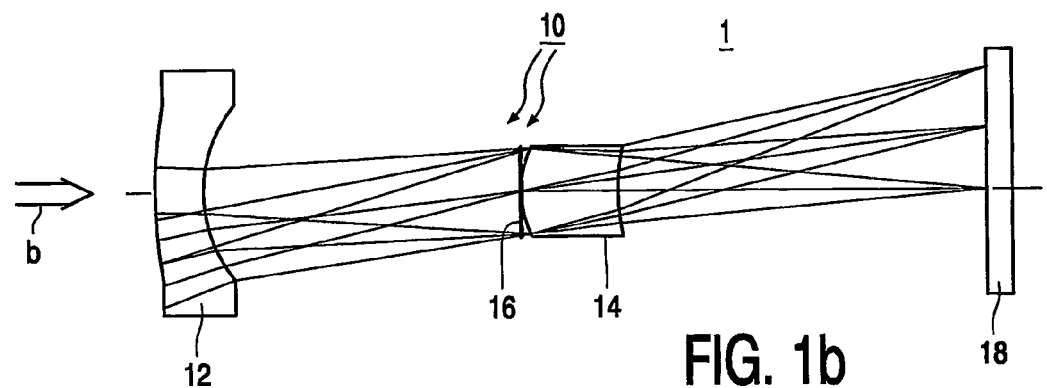

FIGS. 1a and 1b show a basic design of a zoom lens 10 for a miniature camera 1. This camera has a CCD or CMOS image sensor 18 and associated processing electronics (not shown). The camera should be so small that it can be incorporated into a mobile phone or another handheld apparatus. The requirements to be set for such a zoom lens are mainly determined by features of the image sensor, such as its size and resolution and the required zoom factor. In practice the sensor has a diagonal dimension of, for example, 3.36 mm, and the resolution-determining pixel size, is for example, between 5.6 µm and 4.2 µm. A zoom factor of 2 is sufficient. It has been observed that for this application a zoom lens can be designed which has only two lens elements for the image formation. These lenses are a front lens element 12 forming the front lens group and a movable lens element 14 forming the controllable lens group 12. A lens stop 16 is formed by a diaphragm that is arranged near lens element 14 at the side of the front lens element 12. This diaphragm restricts the diameter of the imaging beam and prevents stray radiation or radiation from unwanted reflections from being introduced into the imaging beam and causing a reduction of the contrast in the image formed on the sensor. Such a diaphragm ensures that the beam diameters are the same for all imaging beam portions. The optical track of the zoom lens, i.e. the distance between the front surface of the front lens element and the front surface of the image sensor (image plane), may be, for example, as small as 14 mm.

Zooming, i.e. setting the image size, is performed by displacing the lens element 14 together with the diaphragm 16 along the optical axis OO', thereby changing the focal distance of the zoom lens.

FIG. 1a shows a ray trace plot for a Tele configuration of the zoom lens wherein a small object of the viewed scene is imaged. FIG. 1b shows a ray trace plot for a wide configuration of the zoom lens wherein a large object of the scene is imaged.

In order to keep the image focused on the image sensor for each zoom configuration, a focusing action is needed in addition to a zooming action. Conventionally, such a focusing action is performed by displacing the front lens group or the image sensor along the optical axis of the zoom lens. Space should be reserved for such a displacement, whereby the camera provided with such a zoom lens would be enlarged.

Furthermore, the lens elements of the zoom lens suffer from dispersion, i.e. components of the imaging beam b having different wavelengths are refracted by these lens elements in different ways. To limit the number of lens element to a minimum, a holographic grating may be incorporated in the zoom lens, which grating diffracts components of the imaging beam having different wavelengths in different ways. The grating and the zoom lens can be designed such that the dispersion of the lens elements can be corrected by the wavelength-dependent diffraction of the grating. However, the efficiency of the grating, i.e. the ratio of the amount of radiation diffracted in a required diffraction order to the amount of radiation incident on the grating, is wavelength-dependent. The grating shows an optimum diffraction efficiency for only one wavelength. For other wavelengths a part of the radiation is diffracted in unwanted orders, which results in ghost and blurred images on the image sensor and thus in a decrease in the contrast of the image formed on the image sensor.

Figure 2A:
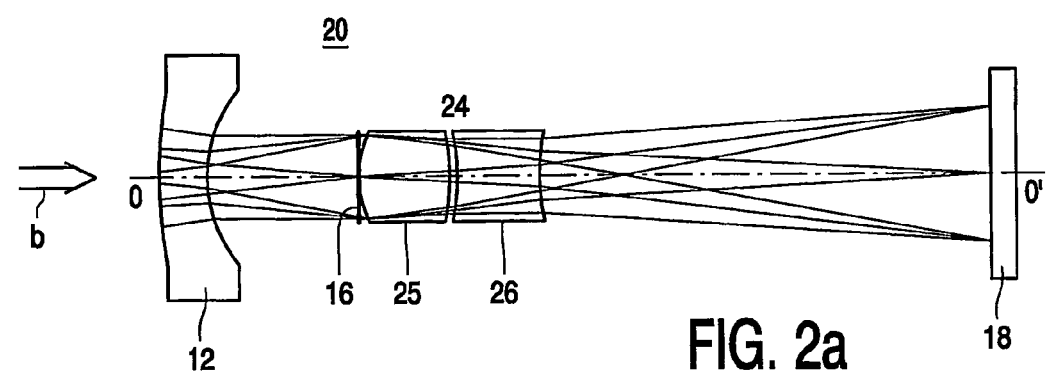
FIGS. 2a and 2b show an embodiment of a zoom lens according to the invention and ray trace plots for the Tele configuration and the wide configuration, respectively, of this zoom lens.
Figure 2B:
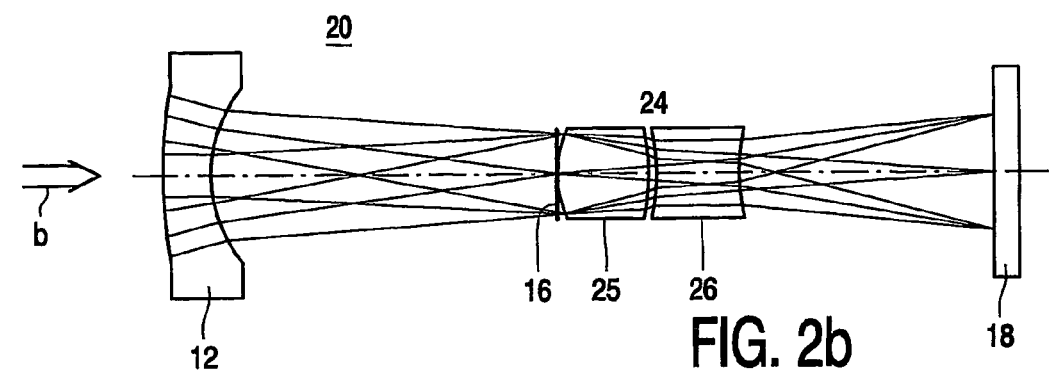

To avoid the decrease in contrast and to allow focusing without displacing the front lens group or the image sensor, the zoom lens of the invention comprises a controllable lens group, which is composed of two lens elements. FIGS. 2a and 2b show a first embodiment of such a zoom lens 20. The new controllable lens group is denoted by reference number 24 and its lens elements by 25 and 26. Lens element 25 may be a positive element having two convex surfaces, and lens element 26 may be a negative lens having two concave surfaces. Lens elements 25 and 26 are made of different lens materials having different dispersions, or Abbe numbers, which allows one of these elements to correct for the dispersion of the other lens element. For example, one of the lens elements 25 and 26 may be made of polycarbonate (PC) whilst the other lens and the front lens element may be made of polymethyl methacrylate (PMMA). Both materials are well-known optical materials. Alternative transparent plastic materials, like cyclic olefin polymer (COC), may be used for the lens elements.

Lens elements 25 and 26 are driven by separate motor drives, known per se and not shown in FIGS. 1a and 1b, so that the lens elements can be moved independently. Focusing is performed in that the lens elements 25 and 26 are moved relative to each other. Zooming is performed in that the lens elements are moved simultaneously in the same direction and over the same distance to and from the front lens element, as shown in FIGS. 2a and 2b, which show the Tele and the wide configuration of the zoom lens, respectively.

As is shown in FIGS. 2a and 2b, a lens stop 16 is arranged at lens element 25, and during a zooming action the stop moves simultaneously with and in the same direction and over the same distance as lens elements 25 and 26. As the diameter of a lens element near the lens stop may be approximately the same as the diameter of the stop aperture, the size of the lens elements can be kept small so that no or a negligible amount of false light will reach the image sensor.

The zoom lens design shown in FIGS. 1a–2b makes it possible to introduce a folding mirror into the zoom lens. In a conventional zoom lens design there is insufficient space available between the lens elements for such a mirror.

Figure 3A:
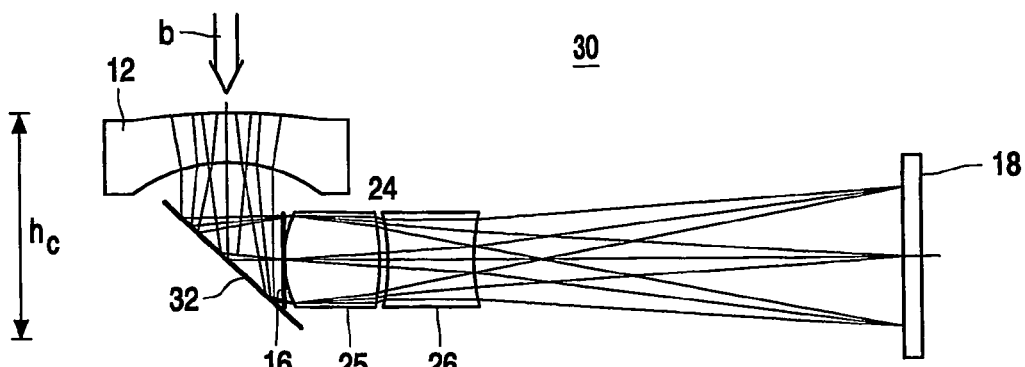
FIGS. 3a and 3b show an embodiment of this zoom lens, which is provided with a first folding mirror and similar ray trace plots.
Figure 3B:
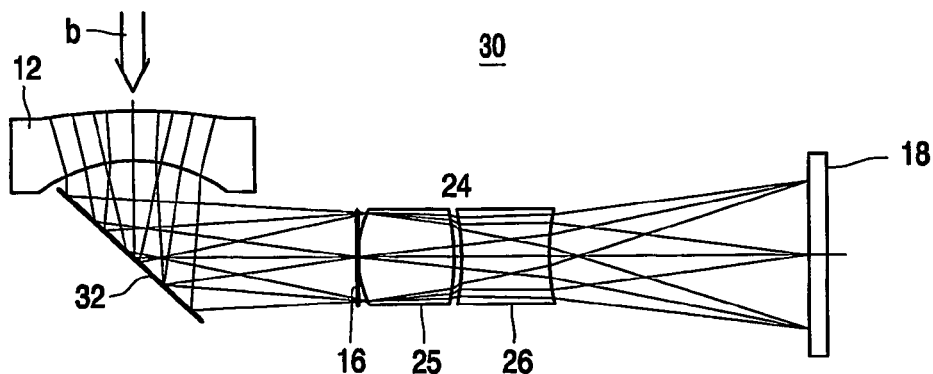

FIGS. 3a and 3b show an embodiment of a zoom lens 30 having a folding mirror 32 arranged between the front lens element 12 and the first lens element of the controllable lens group 24. The imaging beam b from the object scene is incident perpendicularly on the front lens element 12. After having passed this element, the beam is reflected by the mirror 32 at an angle of 90°, i.e. in the horizontal direction, if this mirror is arranged at an angle of 45° with respect to the chief ray of the beam b. The other elements: the lens elements 25 and 26 and the image sensor 18 are arranged in the horizontal direction. This horizontal direction is parallel to the front surface of the apparatus, wherein the camera, i.e. the zoom lens and the images sensor, should be built in. In this way the built-in height $h_c$ of the camera is reduced to the sum of the height of the mirror 32 and the thickness of the front lens element 12.

Including a folding mirror in the zoom lens allows a reduction of the built-in height of the camera to a substantially greater extent than is possible by including a controllable lens group having two independently movable lens elements. However, including such a lens group in a zoom lens, which is already provided with a folding mirror, allows the use of the latter possibility to reduce the built-in height of the camera further and make this height constant.

As is clear from FIG. 3a, which shows a ray trace plot for the Tele configuration of the zoom lens, the lens stop 16 in this configuration is positioned very close to the folding mirror 32. FIG. 3b shows a ray trace plot of the wide configuration of the zoom lens.

Figure 4A:
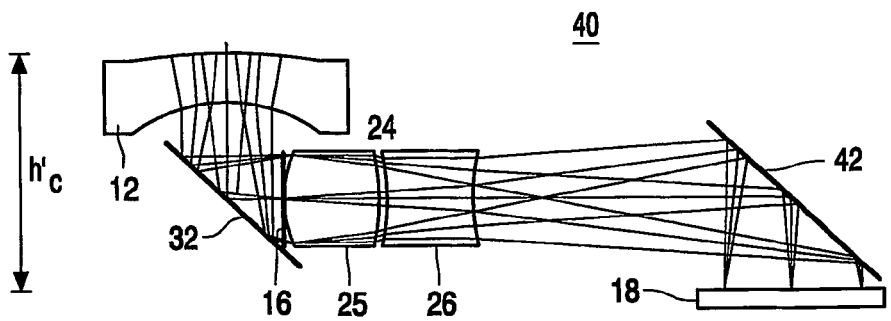
FIGS. 4a and 4b show an embodiment of this zoom lens with a first and a second folding mirror and similar ray trace plots.
Figure 4B:
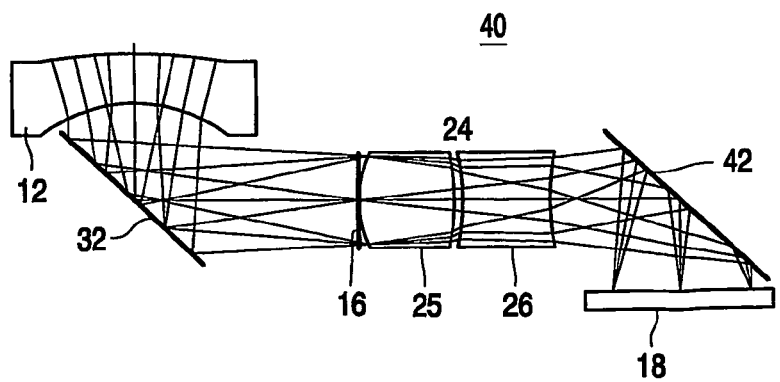

Providing the zoom lens with a second folding mirror can further reduce the total size of the zoom lens. FIGS. 4a and 4b show an embodiment of a zoom lens with such a second mirror and ray trace plot for the Tele configuration and the wide configuration, respectively. The second folding mirror 42 is arranged between the movable lens element 26 and the image sensor 18. This mirror reflects the imaging beam b coming from lens element 26 at an angle of 90°, i.e. in the vertical direction, if it is arranged at 45° with respect to the chief ray of the beam, so that the image sensor can be arranged in this direction. In this way the dimension of the zoom lens, and thus of the camera, in the horizontal direction can be reduced without substantially enlarging the dimension in the vertical direction. This dimension, i.e. the built-in height, is now the distance between the front surface of the front lens element and the front surface of the image sensor. This height may be as small as 3.7 mm. Some additional height, for example 1.5 mm may be required for the image sensor and its packaging.

The folding mirror 42, which reflects the beam downwards, may be replaced by a folding mirror arranged at an angle of 90° with respect to mirror 42 so that the beam is reflected upwards. The image sensor 18 can be arranged at approximately the same height as front lens element 12 in this case.

The preference for a second folding mirror is determined by the thickness of the image sensor. If this sensor, including its packaging is small enough, or if the sensor can be sunk into its printed circuit board (PCB) so that the PCB can be arranged closer to the lens elements, no second mirror is needed.

Figure 5A:
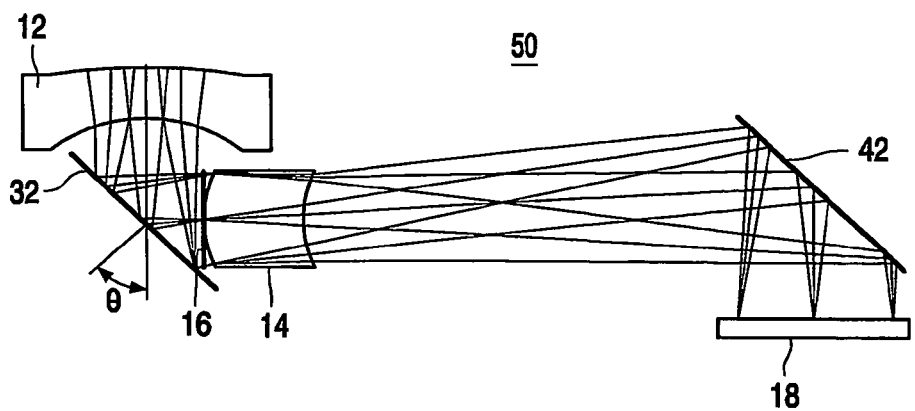
FIGS. 5a and 5b show another embodiment of the zoom lens with two folding mirrors.
Figure 5B:
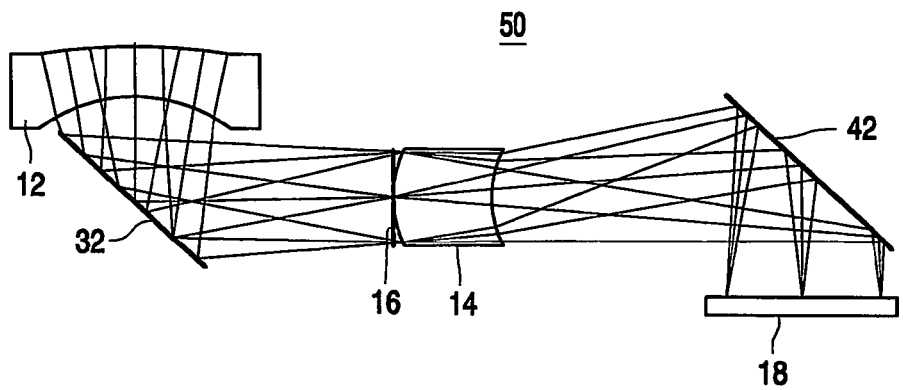

Adapting the tilt of the first folding mirror can further reduce the built-in height of the zoom lens and camera. This is illustrated in FIGS. 5a and 5b, which show ray trace plots for the Tele configuration and the wide configuration, respectively, of such a modified embodiment 50 of the zoom lens. The first folding mirror 12 is arranged such that the angle of incidence θ of the imaging beam b on this mirror is larger than 45°. The beam is reflected slightly upwards from the horizontal direction and the second folding mirror 42 and image sensor are shifted upwards so that they are more in line with the font lens element 12 and the first mirror 32. Although FIGS. 5a and 5b shows a zoom lens with a single movable lens element 14, it will be clear that the first folding mirror with the adapted tilt can also be used in a zoom lens as shown in FIGS. 2a–4b.

Figure 6:
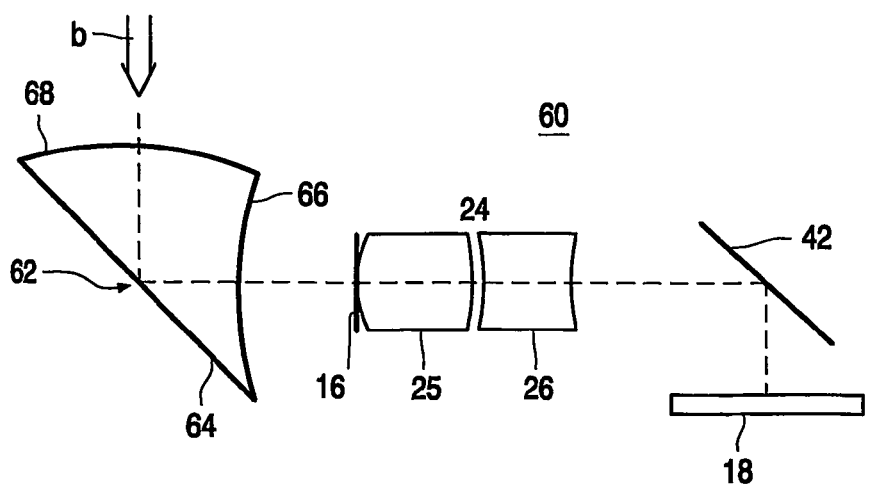
FIG. 6 shows a zoom lens having an integrated folding mirror and front lens element.

As is shown in FIG. 6, the first folding mirror may be integrated with the front lens element into a mirror lens element 62. This element has a reflective flat base surface 64 arranged at an angle of, for example, 45° with respect to the chief ray of the beam b, and two curved surfaces 66 and 68 which form the refractive surfaces of the lens element. In this way the number of elements of the zoom lens and thus its manufacturing cost can be reduced. At least one of the curved surfaces of element 62 may be an aspherical surface, as is the case for the other lens elements of the zoom lens embodiments described above.

A practical embodiment of the new zoom lens having two movable lens elements and shown in FIGS. 2a and 2b has the following characteristics:

|  | Tele | wide |
| --- | --- | --- |
| Focal length | 7.2 mm | 3.6 mm |
| F/number | 5.9 | 4.0 |
| Angle of view diagonal | 26.8° | 56° |

This zoom lens is suitable for cooperation with a CCD or CMOS image sensor having a diagonal dimension of 3.36 mm and comprising 640×480 pixels, so that the pixel pitch is 4.2 μm.

Figure 7:
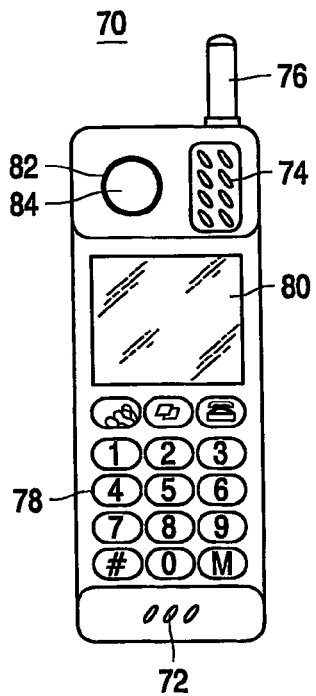
FIG. 7 shows a mobile phone provided with a camera, which includes a zoom lens according to the invention.

FIG. 7 shows an example of a handheld apparatus in which the zoom lens of the invention can be used. The apparatus is a mobile phone 70 shown in front view in FIG. 7. The mobile phone has a microphone 72 which inputs the user's voice as data, a loudspeaker 74 which outputs the voice of a communicating partner, and an antenna 76 which transmits and receives the communicating waves. The mobile phone further comprises an input dial 78 by means of which the user inputs data, such as a phone number to be dialled, and a display 80, for example a liquid crystal display panel. This panel may be used to display a picture of the communicating partner or of the user, or to display data and graphics. A data processing unit (not shown) is included in the mobile phone for processing the input data and the received data.

The phone 70 is provided with a miniature camera 82 comprising a zoom lens as described above for photographing a scene, graphics, or data to be communicated to the partner or the user. Of this camera only the entrance surface 84 of the front lens element 12 of the zoom lens is visible. The other elements of the camera, i.e. the movable lens elements and the image sensor, may be arranged along a line perpendicular to the front surface of the phone, i.e. in the direction perpendicular to the plane of drawing of FIG. 7, if the dimension of the phone in this direction is large enough. Preferably, the zoom lens comprises at least one folding mirror. Then at least the two movable lens elements are arranged along a line parallel to the front surface of the phone, which may then be relatively thin.

The front lens element of the zoom lens may also be arranged in the rear surface of the mobile phone. If the mobile phone is provided with an envelope or cover portion, the zoom lens may be arranged in this envelope, and the front lens element may be arranged in a main surface of this envelope.

Another handheld apparatus in which the invention may be implemented is a personal digital assistant (PDA) provided with a miniature camera. Such a camera with a zoom lens as described above may be arranged in the PDA in the same way as described for the mobile phone.

Figure 8:
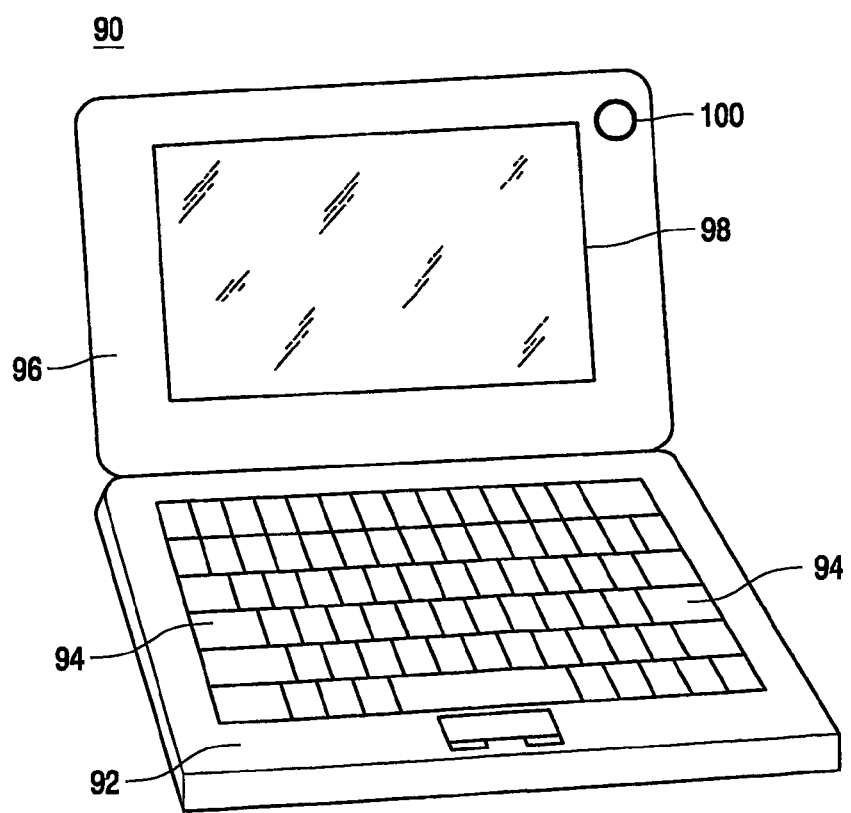
FIG. 8 shows a laptop computer provided with a camera, which includes a zoom lens according to the invention.

FIG. 8 shows a laptop computer (notebook) as an example of a portable apparatus in which the invention may be implemented. The laptop computer 90 comprises a base portion 92 in which a keyboard 95 and the processor unit are incorporated. A cover portion 96, which can be rotated with respect to the base portion, includes a display 98 and a miniature camera 100. Such a camera provided with a zoom lens as described above may be arranged in the laptop in the same way as described for the mobile phone.

The invention has been described with reference to a zoom lens comprising only a front element and a controllable lens group, which zoom lens is intended to be used in a miniature camera having a small image sensor with a moderate pixel pitch, or resolution. A zoom lens for a camera having another type of image sensor may have a rear lens element and a front and/or rear lens group having more than one lens element. The invention may also be used in such a type of zoom lens. Furthermore, the invention can be used not only in a miniature camera for a handheld apparatus, like a mobile phone, a digital personal assistant, a pocket computer and an electronic toy, or for a portable apparatus, but also in other types of built-in cameras. The invention may also be used in non-built-in cameras, like cameras for desktop computers, cameras for intercom systems, and pocket-sized and other-size cameras, for example digital cameras. The camera may be a still picture (photo) camera or a video camera. It is irrelevant for the invention whether the camera uses a film or an electronic sensor, for example a CCD sensor or CMOS sensor.

The invention claimed is:

1. A zoom lens having at least a front lens group and a controllable lens group, characterized in that the controllable lens group comprises two lens elements which are made of different lens materials and are movable with respect to each other for focusing the zoom lens without displacing the front lens group, and further characterized in that the zoom lens comprises a folding mirror arranged between the front lens group and the controllable lens group.

2. A zoom lens as claimed in claim 1 and having a lens stop, characterized in that the lens stop is arranged near the first lens element of the controllable lens group and is movable together with this lens group.

3. A zoom lens as claimed in claim 1, characterized in that it comprises a second folding mirror, which is arranged behind the controllable lens group.

4. A zoom lens as claimed in claim 3, characterized in that the folding mirror is arranged such that the angle between the normal to its reflective surface and the optical axis of the front lens group is greater than 45°.

5. A zoom lens as claimed in claim 1, characterized in that the folding mirror is integrate with the front lens group.

* * * * *